Sept. 2, 1958 — H. P. EVJEN — 2,850,188
SELF UNLOADING FARM TRAILER
Filed Dec. 14, 1956 — 3 Sheets-Sheet 3
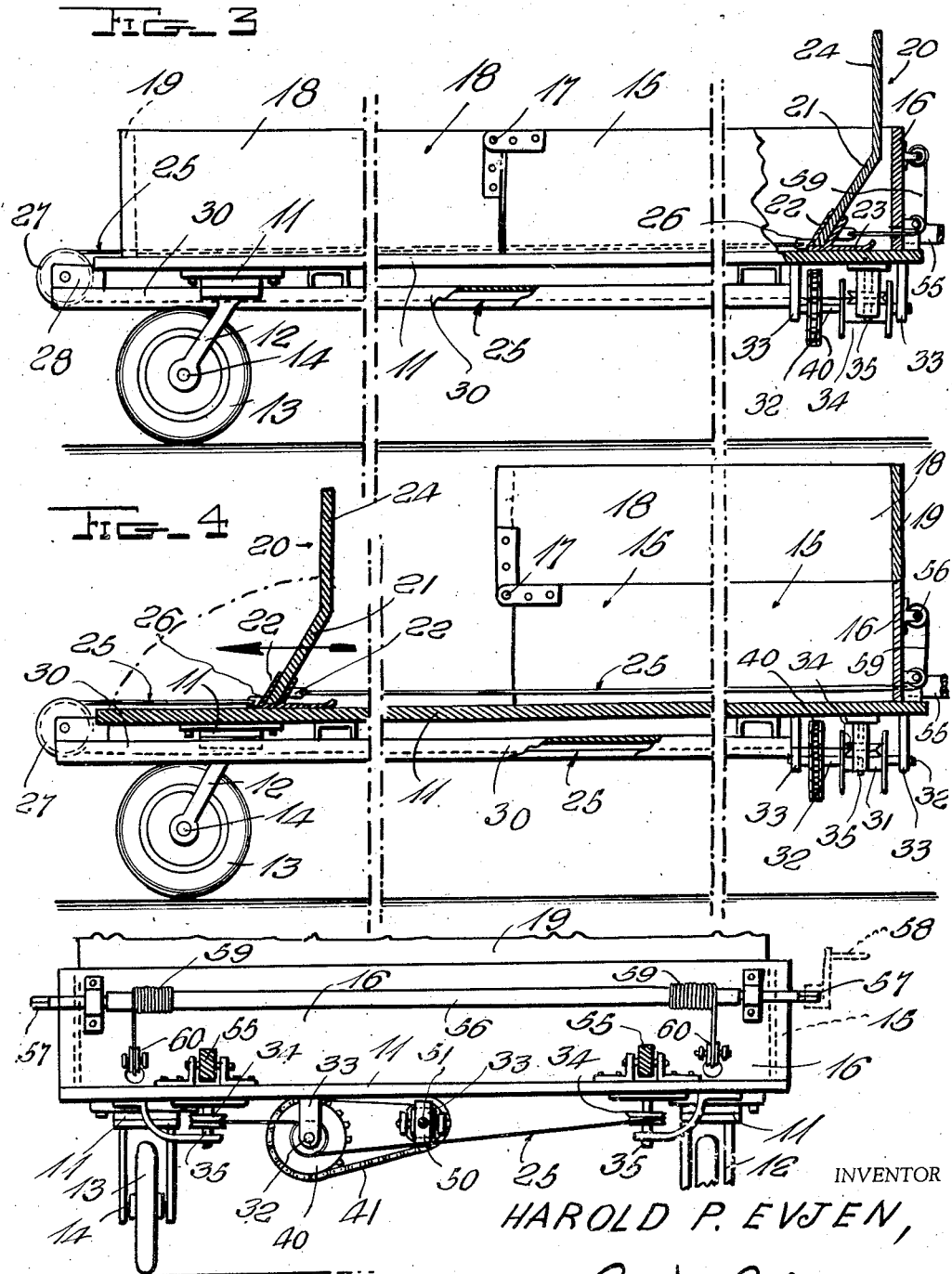
INVENTOR
HAROLD P. EVJEN,
ATTORNEY

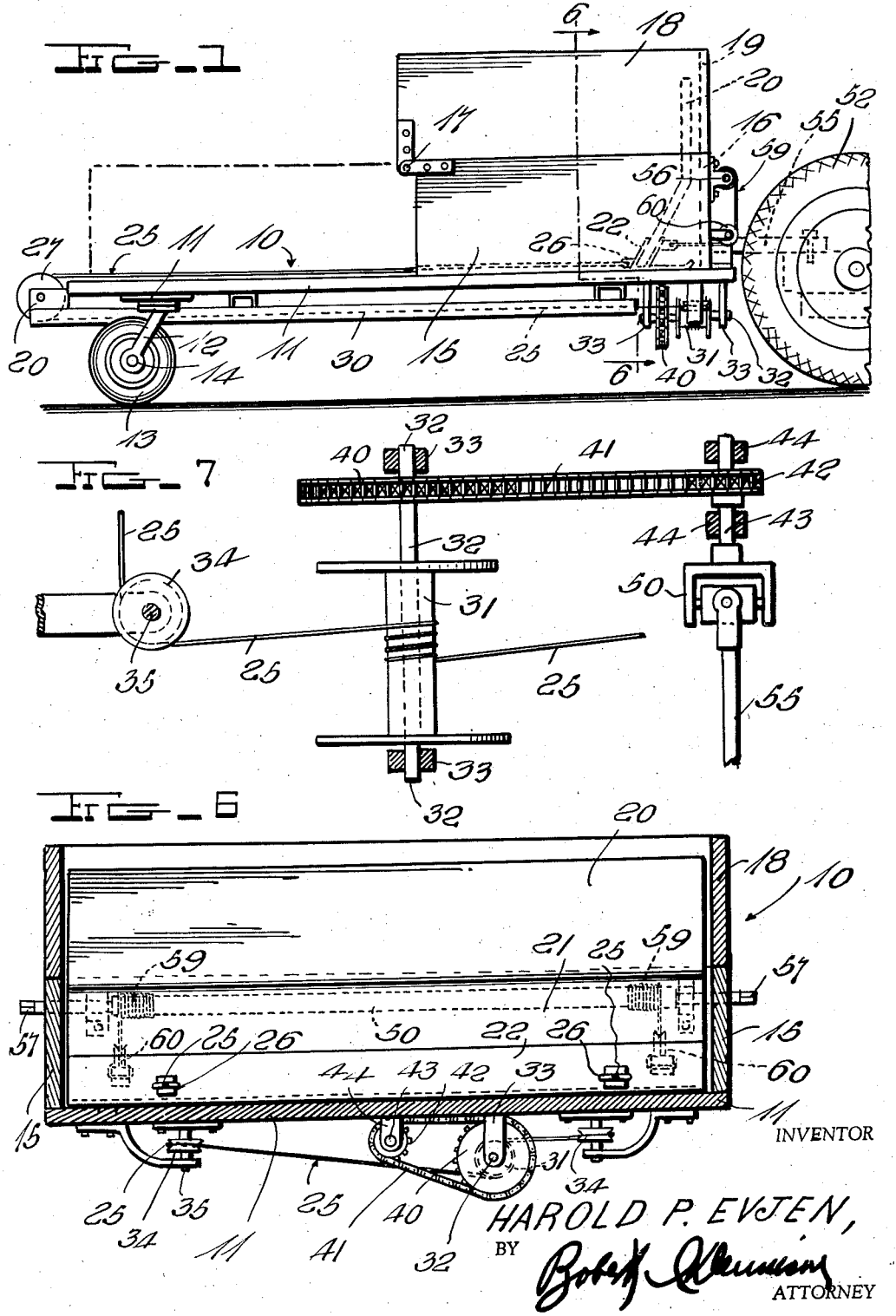

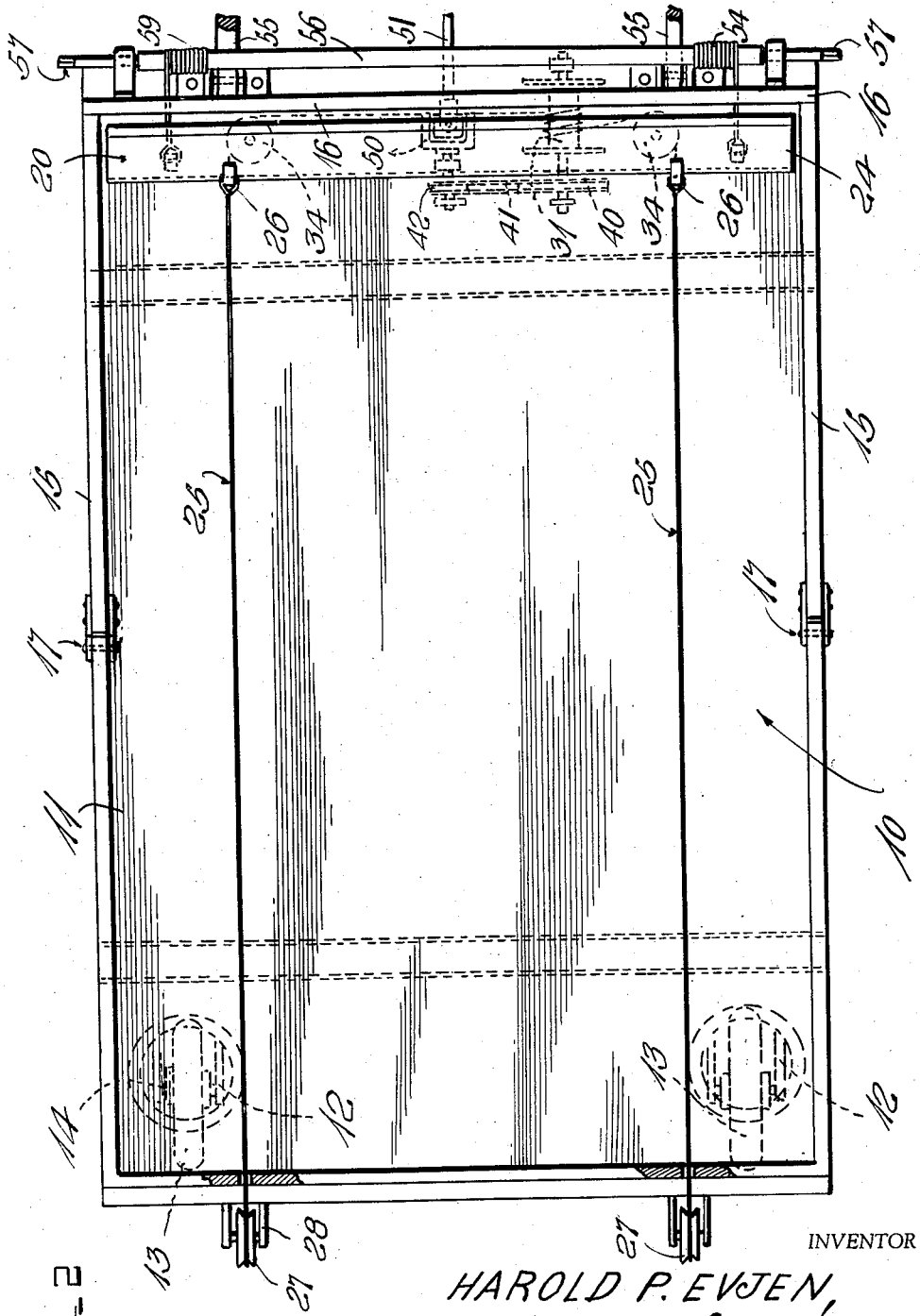

United States Patent Office 2,850,188
Patented Sept. 2, 1958

2,850,188

SELF UNLOADING FARM TRAILER

Harold P. Evjen, Stony Plain, Alberta, Canada

Application December 14, 1956, Serial No. 628,437

2 Claims. (Cl. 214—82)

This invention relates to a farm trailer and more particularly to an unloading farm trailer.

A primary object of this invention is the provision of an economical and versatile farm trailer provided with an unloading false gate movable by means of mechanism operable by the power take-off of the conventional farm tractor.

An additional object of the invention is the provision of such a trailer which, being tractor drawn, relieves horses for other uses on the farm.

Still another object of this invention resides in the provision of a hinged body, by means of which the trailer may be readily and easily converted from a dray type trailer to a grain box or the like.

Still another object of the invention is the provision of caster wheels on the trailer facilitating manipulation under complete control of the tractor, particularly while backing.

Still another object of the invention is the provision of separate means for manually operable means for returning the false end gate or unloading member to operative position after the power driven means have moved the same to completely unloaded position.

Still other objects reside in the combination of elements, arrangements of parts, and features of construction, as will be more fully pointed out hereinafter and shown in the accompanying drawings.

Further objects reside in a device which is sturdy and durable in construction, reliable and efficient in operation, and relatively simple and inexpensive to manufacture and utilize.

Other objects will in part be obvious, and in part be disclosed hereinafter.

In the drawings:

Fig. 1 is a side elevational view of the complete trailer shown as connected to a tractor, only a portion of the latter being shown.

Fig. 2 is a top plan view of the trailer of Fig. 1 on an enlarged scale, certain concealed portions thereof being shown in dotted lines.

Fig. 3 is an enlarged side elevational view of the trailer body of Fig. 1 in a different position of adjustment.

Fig. 4 is a side elevational view similar to Fig. 3, but showing the parts in a still further position of adjustment, parts thereof being sectional.

Fig. 5 is a front elevational view, partially sectional, of the trailer body.

Fig. 6 is a sectional view of the trailer taken substantially along the line 6—6 of Fig. 1, as viewed in the direction indicated by the arrows, and Fig. 7 is an enlarged view of a constructional detail.

Similar reference characters refer to similar parts throughout the several views of the drawings.

Having reference now to the drawing, there is generally indicated at 10 a trailer body of the class described, which includes a trailer bottom 11 from the underside of which depend brackets 11a, swivelably mounted, as at 12, on opposite sides of the body adjacent the rear end thereof, and carrying caster wheels 13 mounted on axles 14, for free swiveling caster action.

The upper side of floor carries a pair of side portions 15 and an end partition 16, adjacent the front end thereof, the portions 15 extending approximately one-half the length of the bed or bottom 11.

Pivotally secured, as by pivots 17, is a second body section, including side plates 18 and an end closure plate 19, so that the second body section may be swung rearwardly to overlie the partitions 15 and 16.

A false end gate or pusher 20 is carried slidably on bottom 11. End gate 20 is comprised of an inclined portion 21 secured in brackets 22 having extended skids 23 to maintain the apparatus 23 in upright position, and a vertical portion 24. Gate 20 is positioned at the front of the vehicle to push material in the trailer body toward the rear and hence to dump such material from the rear of the vehicle whether the vehicle is stationary or in motion. The means for effecting this movement comprise a cable 25 connected at its two ends to false end gate 20 on the side facing the rear of the vehicle as indicated at 26. Cables 25 extend rearwardly of the vehicle and over pulleys 27 suitably supported by brackets 25 extending rearwardly and downwardly of the body (see Fig. 2) and thence along the underside of the body, within angle irons 30 to a drum 31 carried by a shaft 32 on the forward underside of the trailer. Shaft 32 is journaled in brackets 33 suitably secured to the underside of the trailer. The cable 25, before engaging drum 31, passes over horizontal pulleys 34 mounted on shafts 35 mounted in brackets 36 secured to body member 14.

Shaft 32 also carries a sprocket 40 which is connected by a chain 41 to a second sprocket 42 carried on a suitable axle 43 which is journaled in a bracket 44 to the underside of the trailer body.

The sprocket 42 is connected by a universal joint 50 to a shaft 51 which extends to the power take-off (not shown) of the tractor (also not shown) but indicated in Fig. 1 by the wheels 52, the tractor being of conventional type and connected to trailer 10 as by means of a draw bar 55, the draw bar being of the conventional V-shaped type.

From the foregoing it will now be seen that the gate 20 may be moved rearwardly by the aforediscussed power means.

For retraction of the gate there is provided a shaft 56 secured to the rear end of the trailer body, and provided with serrated ends 57 for the reception of a suitable crank, as indicated at 58 in Fig. 5, about which shaft, adjacent opposite ends thereof, are wound cables or cords 59 which are connected via pulleys 60 to the front side of end gate 20. By rotation of the crank 58 the shaft 57 is rotated to withdraw false end gate to the forward end of the trailer vehicle.

It will thus be seen, from the foregoing, that there is herein provided a trailer dump device adapted for connection to a vehicle which is adapted to provide mechanical power-driven means for facilitating the dumping of the load and manual retraction of said means, since no pressure is then exerted thereagainst, said means in both instances comprising cable connections to a false end gate contained within the vehicle body, the first mentioned means being connected by a chain and sprocket connection through a reduction gearing system to the power take-off of a conventional tractor, and said last mentioned means being associated with the forward end of the trailer vehicle and operable through a hand crank.

As various embodiments may be made of this inventive concept and as various modifications may be made in the embodiment hereinbefore shown and set forth, it is to be understood that all matter herein is to be interpreted merely as illustrative and not in a limiting sense.

I claim as my invention:

1. A trailer vehicle body, comprising a fixed horizontal floor, a pair of side wall portions fixed to said floor and projecting upwardly from the opposite edges thereof, a front end wall fixed to the forward ends of said side wall portions, a second pair of side wall portions co-planar with said first side wall portions, a rear end wall fixed to said last mentioned side wall portions, said first and second side wall portions being of equal height, pivotal connections between the adjacent ends of said first and second side wall portions for swinging movement of said second pair of side wall portions relative to said first pair of fixed side wall portions, providing for longitudinal alignment thereof in the formation of a laterally enclosed body and for swinging said second pair of side wall portions together with the rear end wall to a position wherein the normally upper edges of said second pair of side walls and the rear end wall rest upon the upper edges of said first pair of side walls, means for extruding the contents of the body from the rear end thereof upon the second mentioned position of said second pair of side wall portions and the rear end wall, said extruding means comprising a gate disposed transversely of said floor and normally disposed adjacent said front end wall, said gate including a bottom portion upwardly inclined toward said front end wall, and an upper vertical portion, the lower edge of said bottom portion being seated in a bifurcated bracket having a floor engaging skid projecting toward said front end wall, cables having ends fixed to said bracket on opposite sides of said gate for selective movement of the same longitudinal of said body, said cables comprising a pair thereof having corresponding ends connected to said bracket and having the opposite ends thereof wound on a drum disposed beneath said floor adjacent said front end wall, a shaft on which said drum is supported, a second power driven shaft parallel to said first shaft, a sprocket wheel on each shaft, and a chain operatively engaged with said sprocket wheels.

2. A trailer vehicle body, comprising a fixed horizontal floor, a pair of side wall portions fixed to said floor and projecting upwardly from the opposite edges thereof, a front end wall fixed to the forward ends of said side wall portions, a second pair of side wall portions co-planar with said first side wall portions, a rear end wall fixed to said last side wall portions, said first and said second side wall portions being of equal height, pivotal connections between adjacent ends of said first and second side wall portions for swinging movement of said second pair of said side wall portions relative to said first pair of fixed side wall portions, providing for longitudinal alignment thereof in the formation of a laterally enclosed body and for swinging said second pair of the side wall portions together with the rear end wall to a position wherein the normally upper edges of said second pair of the side walls and the rear end wall rest upon the upper edges of said first pair of side walls, means for extruding the contents of said body from the rear end thereof upon the second mentioned position of said second pair of the side wall portions and the rear end wall, said extruding means comprising a gate disposed transversely of said floor and normally disposed adjacent said front end wall, said gate including a bottom portion upwardly inclined toward said front end wall, and an upper vertical portion, the lower edge of said bottom portion being seated in a bifurcated bracket having a floor engaging skid projecting toward said front end wall, and cables having ends fixed to said bracket on opposite sides of said gate for selective movement of the same longitudinally of said body, said cables comprising a pair thereof disposed in front of said gate and having corresponding ends thereof connected to said bracket, a pair of pulleys rotatably supported on the outer face of said front wall, said front wall being provided with apertures through which said cables extend and engage said pulleys, a shaft rotatably supported on the outer face of said front end wall above said pulleys and in parallel relation to the axes thereof, said second pair of cables being wound on said shaft, and the opposite ends of said shaft being formed for engagement of a hand crank therewith.

References Cited in the file of this patent

UNITED STATES PATENTS

| | | |
|---|---|---|
| 1,567,690 | Weaver | Dec. 29, 1925 |
| 2,179,586 | Carpenter | Nov. 14, 1939 |
| 2,287,055 | Olson | June 23, 1942 |
| 2,298,982 | Smith | Oct. 13, 1942 |
| 2,463,643 | Recker | Mar. 8, 1949 |
| 2,512,339 | Knapp | June 20, 1950 |
| 2,747,476 | Manuel | May 29, 1956 |